United States Patent

[11] 3,608,658

| [72] | Inventors | William L. Woodfill<br>Oshkosh;<br>James R. Meininger, Fond Du Lac, both of Wis. |
|---|---|---|
| [21] | Appl. No. | 33,339 |
| [22] | Filed | Apr. 30, 1970 |
| [45] | Patented | Sept. 28, 1971 |
| [73] | Assignee | Brunswick Corporation<br>Chicago, Ill. |

[54] STEERING MECHANISM FOR SNOWMOBILE
2 Claims, 3 Drawing Figs.

[52] U.S. Cl. ................................................ 180/5 R,
74/99 A, 280/21 R
[51] Int. Cl. ................................................ B62m 27/02

[50] Field of Search ................................................ 180/5, 5 A,
3, 4, 6; 280/16, 21; 74/497, 20, 89, 99 A

[56] References Cited
UNITED STATES PATENTS

| 2,989,871 | 6/1961 | Straab | 74/99 |
| 3,504,752 | 4/1970 | Milward | 180/5 |
| 3,550,706 | 12/1970 | Watkins | 180/5 |

Primary Examiner—Richard J. Johnson
Attorney—Roy T. Montgomery

ABSTRACT: Each steering spindle for a snowmobile is mounted with cam and cam follower interposed between the upper end of the spindle and the snowmobile frame. The cams are arranged to extend the outside ski and withdraw the inside ski when turning to force the snowmobile to lean into a corner with corresponding improved steering response.

PATENTED SEP 28 1971
3,608,658
SHEET 1 OF 2
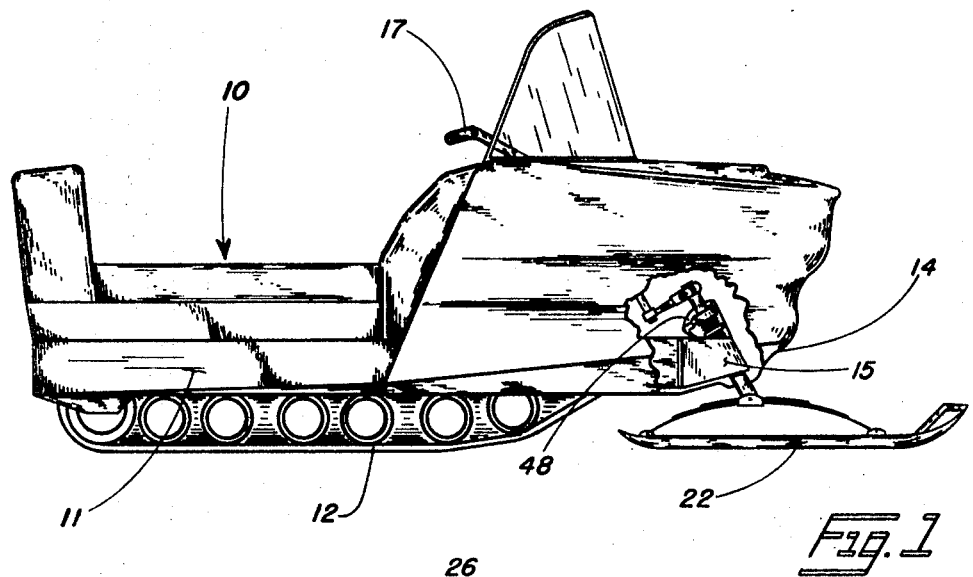
Fig. 1
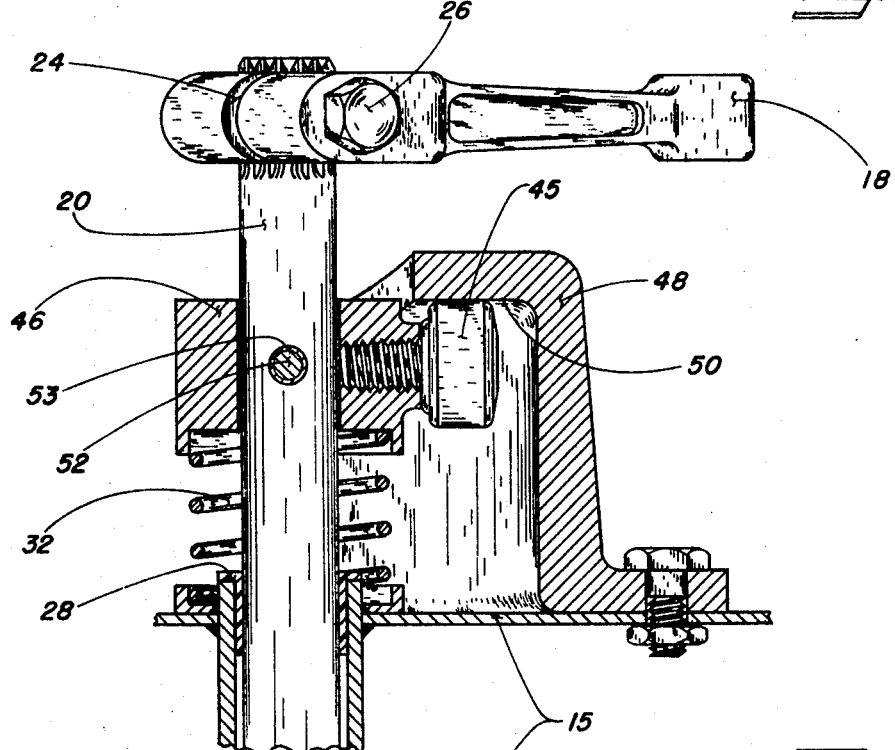
Fig. 3
INVENTORS.
WILLIAM L. WOODFILL
BY  JAMES R. MEININGER
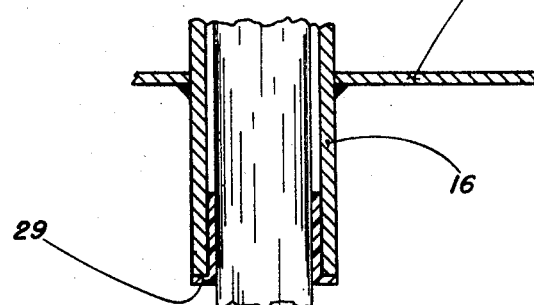
ATTORNEY

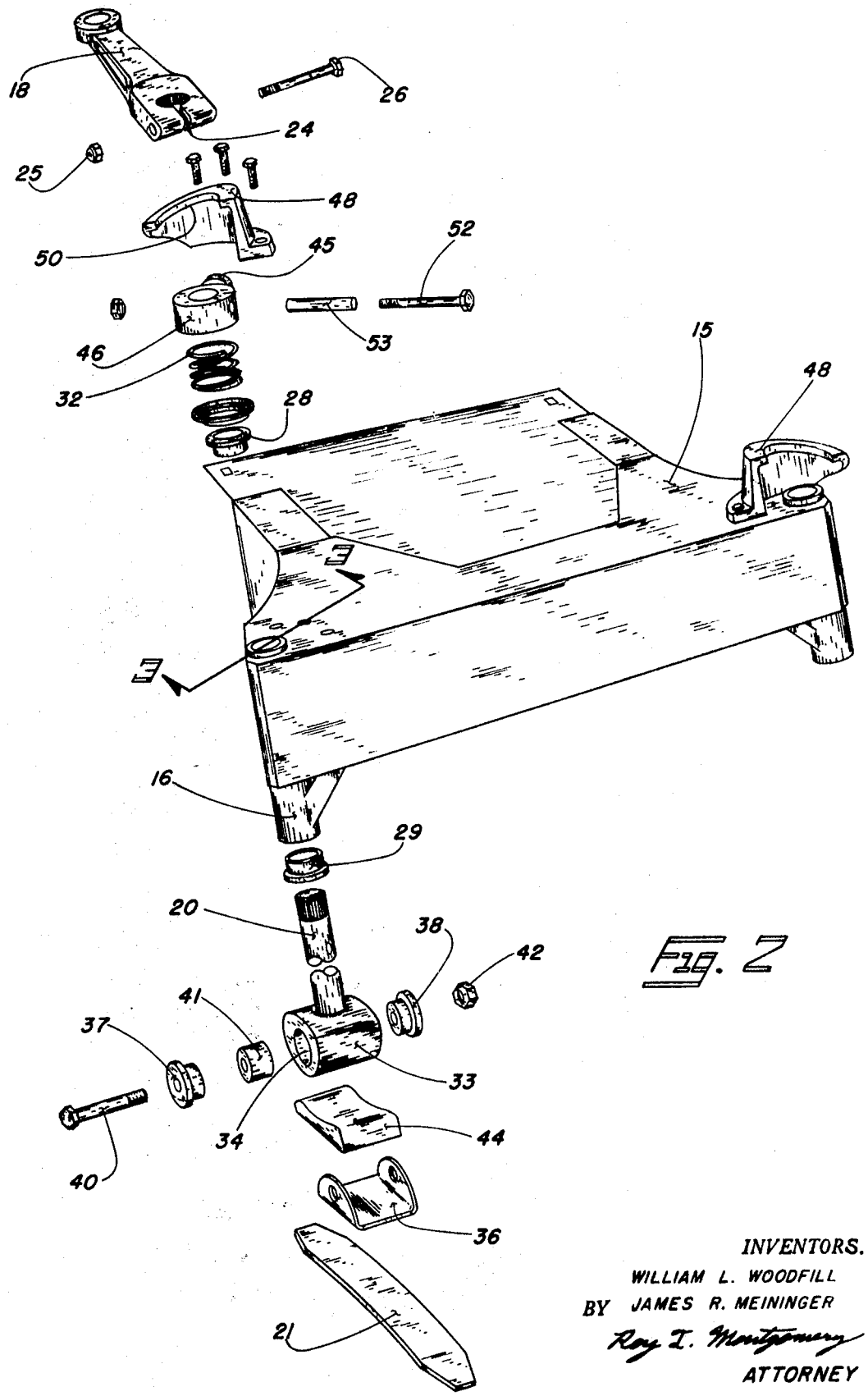

STEERING MECHANISM FOR SNOWMOBILE

The invention disclosed herein is related to that disclosed in copending application, Ser. No. 33,390 filed Apr. 30, 1970 of Jerry K. Talmage and assigned to the common assignee.

BACKGROUND OF THE INVENTION

This invention relates to a steering mechanism for snowmobiles.

Snowmobile operators generally use their bodies to counterbalance the snowmobile when turning to prevent it from tipping over. This invention provides an automatic means for tipping a snowmobile into a turn to aid in stability.

SUMMARY OF THE INVENTION

In this invention, each steering spindle is slidably carried by the vehicle. Each spindle has a cam follower fixed thereto. Oppositely sloping cam surfaces are fixed to the frame on each side of the vehicle in position for engagement by the cam follower. As a result, when the snowmobile is turned, the outer ski is automatically extended and the inner ski withdrawn.

DESCRIPTION OF THE DRAWINGS

In the drawings:

FIG. 1 is a plane view of the snowmobile utilizing the steering mechanism of this invention.

FIG. 2 is an exploded view of the spindle mounting of the present invention.

FIG. 3 is a longitudinal sectional view of the spindle assembly of an assembled snowmobile taken along lines 3—3 of FIG. 2.

DESCRIPTION OF THE PREFERRED EMBODIMENT

Referring to FIG. 1 there is shown a snow vehicle 10 upon which this invention may be used. The vehicle 10 includes generally a tunnel member 11 which extends from the front to the rear thereof. The tunnel member 11 supports a track 12 for driving the vehicle 10. The track 12 is driven by an engine (not shown) which is mounted under the front cowl assembly 14. Fixed to the front of the tunnel member 11 is a crossmember assembly 15 (FIG. 2) which includes a pair of generally vertical tubular support members 16 fixed to each side thereof.

The vehicle 10 also includes a steering mechanism for controlling the direction of movement of the vehicle. The steering mechanism includes handle bars 17 which are operably connected in a conventional manner to a pair of steering arms 18 (FIG. 2 only one being shown). Each steering arm 18 is fixed to the upper end of a generally vertical spindle member 20 the bottom of which is attached to the leaf springs 21 which in turn are attached to the respective ski 22.

The structure between the steering arm 18 and the leaf springs 21 is shown in more detail in FIG. 2. One end 24 of the steering arm 18 has a splined hole extending therethrough for engagement with mating splines on the upper end of the respective spindle 20. The end 24 is split and there is provided a nut 25 and bolt 26 for clamping the steering arm 18 onto the spindle at assembly. Each spindle 20 is rotatably and slideably mounted in the respective tubular support member 16 by means of nylon bushings 28 and 29 at each end thereof. The lower end of each steering spindle 20 has an enlarged portion 33 thereon with a horizontal hole 34 extending therethrough. A bracket member 36 is pivotally connected to the portion 33 by means of two plastic bushings 37 and 38 held in place by bolt 40 which extends through the bracket 36 and a sleeve member 41 and is engaged by nut 42. The bracket member 36 is fixed to the leaf springs 21 in a conventional manner such as by bolts and nuts (not shown). Interposed between the enlarged portion 33 of the spindle 20 and the bracket member 36 is a rubber bumper 44 which aids in absorbing shock and limits the tilting range of the ski on its horizontal axis.

Camming means is interposed between the steering mechanism for extending the outside ski and withdrawing the inside ski when the vehicle is turned. Such camming means is shown generally in FIG. 2 and in more detail in FIG. 3. The camming means includes a cam follower or roller 45 which is fixed to a support member 46. A support member is pinned to the upper portion of the spindle by means of a pin 52 and a sleeve 53. A generally cup-shaped cam member 48 is fixed to the crossmember assembly 15 adjacent the tubular support member 16 on each side thereof. Each cam member 48 has a horizontal cam surface 50 sloped such as shown in FIG. 2 to force the cam follower on the right side to be extended on turning left and withdrawn when turning right. Similarly the camming surface 50 on the left-hand side is sloped to force the cam which is fixed to the left ski downwardly when the vehicle is turned to the right and allows it to withdraw when the vehicle is turned to the left. Interposed between the steering mechanism or more specifically the support member 46 and the vehicle or more specifically the crossmember assembly 15 is a resilient biasing means or spring 32. The spring 32 is compressed and tends to urge the steering mechanism upwardly with respect to the crossmember assembly to maintain the camming means and constant engagement.

Naturally, one disadvantage of forcing the skis outwardly when turning is that the force must be overcome by a larger steering force. In other words, the steeper the outer cam the more force is required to turn the vehicle. It has been found, however, that an extension of one-half inch of the outer ski and withdrawal of one-half inch of the inner ski upon turning the skis 30° improves the handling characteristics of the vehicle substantially without unduly increasing the steering force required.

It is apparent that many modifications and variations of the invention as hereinbefore set forth may be made without departing from the scope and spirit hereof. The specific embodiment described is intended to be the preferred embodiment but is given by way of example only and the invention is limited only by the terms of the dependent claims.

We claim:

1. In a snow vehicle having a front crossmember assembly having a generally vertical tubular support member near each outer edge thereof, a steering mechanism including a generally vertical spindle supported in each said tubular support member on the front of the vehicle for axial movement and rotational movement about its axis and a ski fixed to the lower end of said spindle for steering said vehicle, the improvement comprising:
   a. cam means interposed between the steering mechanism and the vehicle for extending the ski when said ski is turned in one direction and withdrawing the ski when said ski is turned in the other direction said cam means including a generally cup-shaped member having a downwardly facing support and camming surface fixed to the upper portion of the crossmember assembly of said vehicle and generally adjacent to the tubular support member;
   b. a cam follower fixed to the upper portion of said spindle and in engagement with said support and camming surface, and means interposed between said crossmember assembly and said cam followers for biasing said cam follower into operable engagement.

2. The improvement of claim 1 in which the cam follower comprises a roller.